United States Patent [19]

Sindler et al.

[11] 3,778,867
[45] Dec. 18, 1973

[54] METHOD AND APPARATUS FOR EVISCERATING ANIMALS AND FOWL

[76] Inventors: Milard S. Sindler, 3701 Twin Lakes Ct., Baltimore, Md. 21133; Russell Sindler, 2413 Hol Cir., Baltimore, Md. 21209

[22] Filed: Apr. 10, 1972

[21] Appl. No.: 242,341

[52] U.S. Cl............................ 17/11, 30/276, 17/52, 17/23
[51] Int. Cl............................................. A22c 25/18
[58] Field of Search........................... 17/11, 23, 52; 30/276, 286, 278, 282

[56] References Cited
UNITED STATES PATENTS
1,928,718   10/1933   Covey.................................. 30/276
3,616,488   11/1971   Barefield............................... 17/11

Primary Examiner—Louis G. Mancene
Assistant Examiner—D. L. Weinhold
Attorney—J. Wesley Everett et al.

[57] ABSTRACT

A method and apparatus for eviscerating animals and fowl, the apparatus having a pair of double circular rotatable cutter blades of substantially the same diameter and operating in spaced relationship in respect to each other and in parallel planes, rotatably supported on a supporting means, including guides fixedly secured to the support extending outwardly from the support in close proximity to a portion of the cutting blades for guiding the cutting blades in a predetermined line over the outer surface of the animal or fowl and along each side of the vertebrae for separating the same along with the viscera from the remainder of the carcass.

3 Claims, 10 Drawing Figures

PATENTED DEC 18 1973

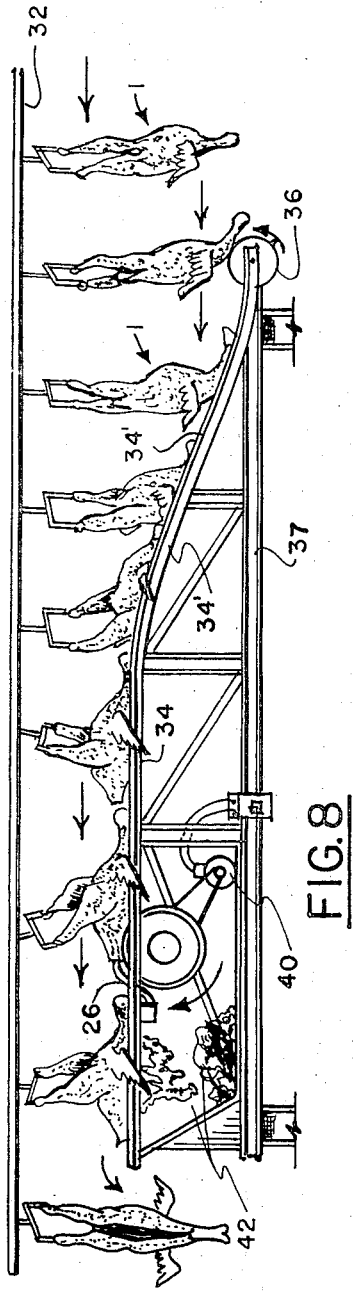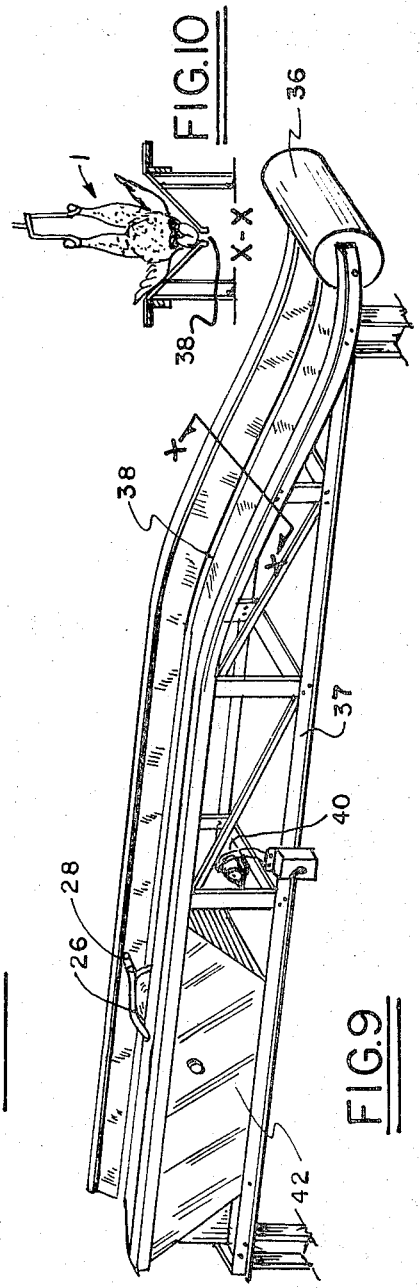

METHOD AND APPARATUS FOR EVISCERATING ANIMALS AND FOWL

The present invention relates broadly to a new and novel method and apparatus for eviscerating animal, and particularly fowl, carcasses.

One way, and possibly the most general way, to remove viscera from the animal or fowl is still withdrawing the viscera by hand through an opening in the carcass made by cutting away the area surrounding the cloaca. The viscera is torn from the inner lining of the cavity where it is attached adjacent the vertebrae.

Another presently used method of removing the viscera is to split the front or back of the animal or fowl throughout its length and remove the viscera through the opening by pulling the viscera loose from the inner lining of the cavity similarly to that described above. Both of these methods are time consuming and tend to disarrange the viscera and at times these methods also damage the edible portion of the viscera. In addition, this type of operation does not lend itself to rapid and complete inspection of the viscera and animal or fowl being eviscerated.

One object of the present invention is to provide a new and novel method and apparatus for removing the viscera in a more scientific manner, that is, the viscera is removed in a more orderly fashion making it more easily available for inspection.

Another object of the invention is to provide an apparatus that will cause minimal damage to the viscera during its removal from the animal or fowl.

A further object of the invention is to provide an apparatus that is fully, or semi, automatic capable of high and accurate operation.

Still another object of the invention is to provide an apparatus with a pair of spaced cutter blades that is designed to sever at the same time both the vertebrae and the cavity lining to which the viscera is attached.

Still another object of the invention is to provide an apparatus having guide means for the cutting blades to guide and confine the blades along a predetermined line and at a pre-set depth, which insures the viscera from damage.

While several objects of the invention have been set forth, other objects, uses and advantages of the method and machine disclosed herein will be come more apparent as the nature of the method and apparatus are fully disclosed in the following detailed description with reference to the accompanying drawings.

FIG. 8 shows the apparatus secured to a fixed support and illustrates the manner in which the fowl is conveyed over the fixed support for carrying out the eviscerating operation.

FIG. 9 is a perspective view of the fixed support for arranging the fowl in a horizontal position in order that it will be engaged by the guide members of the apparatus as the fowl is moved over its surface for removing the vertebrae and the viscera.

While the apparatus may be used for most kinds of vertebrate animals, it is directed specifically to fowls.

Referring first to the method of removing the viscera from the fowl.

The inner cavity of the fowl 1 is provided with a lining 2 surrounding the viscera and which is attached in close proximity to the vertebrae 3, as shown at 2' and 2''. By severing the vertebrae by cutting along each side thereof and the part of the inner lining adjacent the vertebrae, practically all the viscera is removed with the vertebrae. Also, the viscera will be left intact along the vertebrae which is easily inspected along with the vertebrae. This also makes for easy separation of the edible organs from the remaining portion of the viscera, the separation being a scientific and practical approach for removing the viscera 5 from the fowl.

Figure 1:
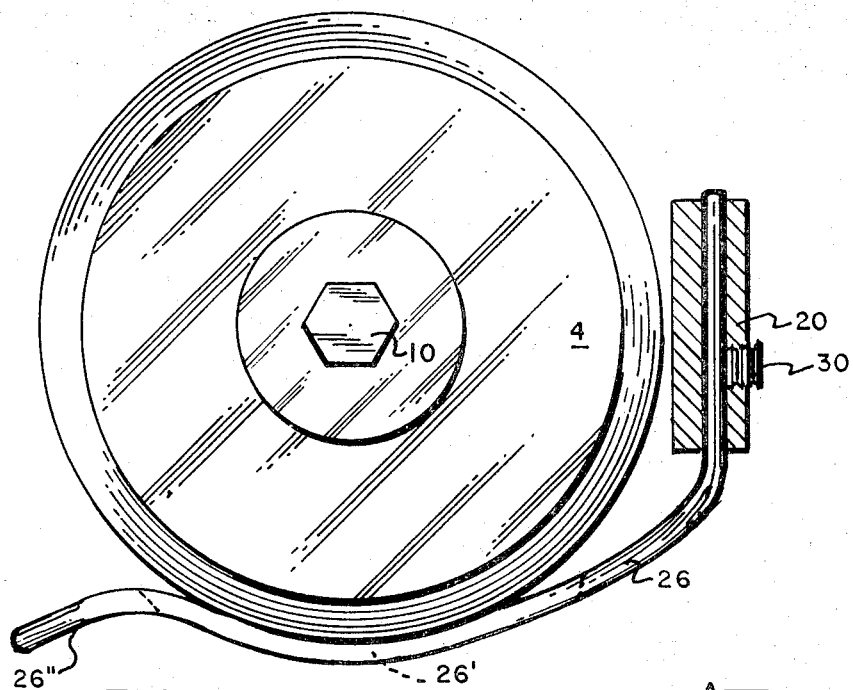
FIG. 1 is an end view partly in elevation and partly in section of the cutting machine.
Figure 2:
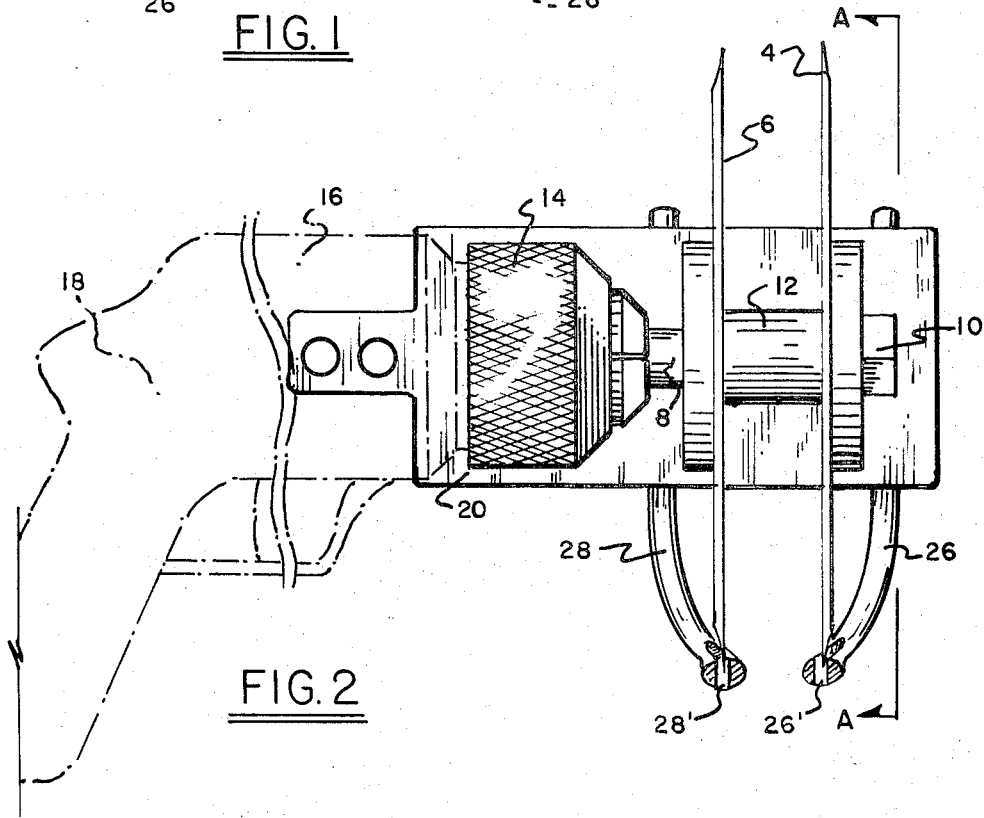
FIG. 2 is a side view in elevation of the machine.
Figure 3:
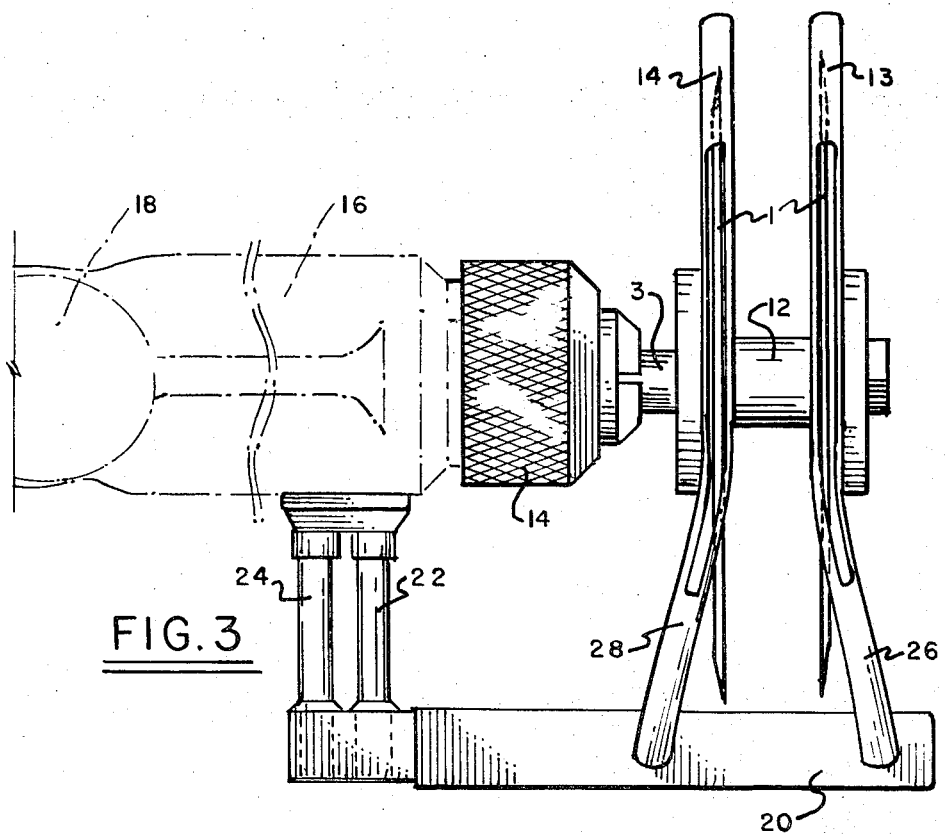
FIG. 3 is a bottom plan view of the machine.

The detailed construction of the apparatus for removing the viscera is shown particularly in FIGS. 1, 2 and 3. The apparatus is provided with a pair of circular cutting blades 4 and 6 mounted on a spindle 8 and secured thereto by a fastening means 10. The cutters are spaced apart by a suitable spacer 12, the spindle is secured in a chuck 14 which is operated by a motor 16 (not shown). In the portable type of apparatus, as shown in FIGS. 1, 2 and 3, there is provided a handle member 18 for supporting and maneuvering the cutter blades.

Figure 6:
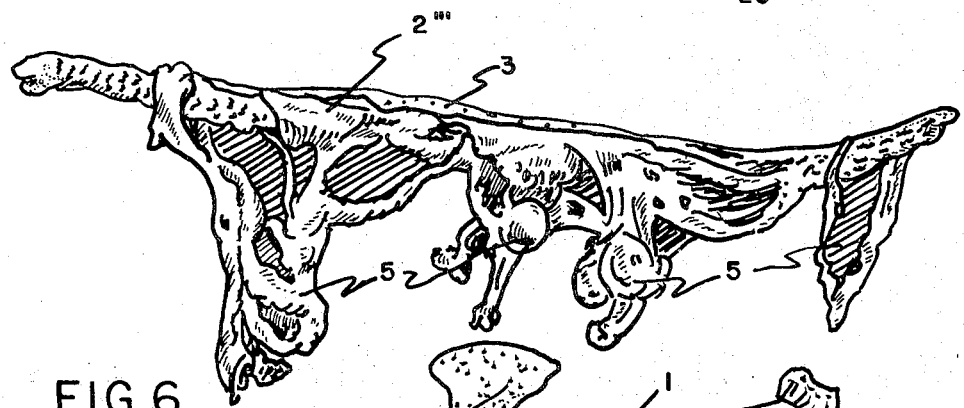
FIG. 6 is an elevational view showing the removed vertebrae together with the viscera attached thereto.
Figure 7:
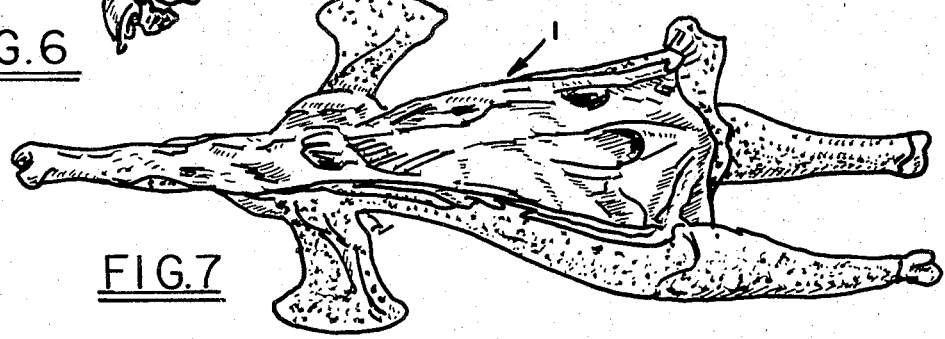
FIG. 7 is a plan view of a fowl after the vertebrae and viscera have been removed. This figure is on a reduced scale.
Figure 4:
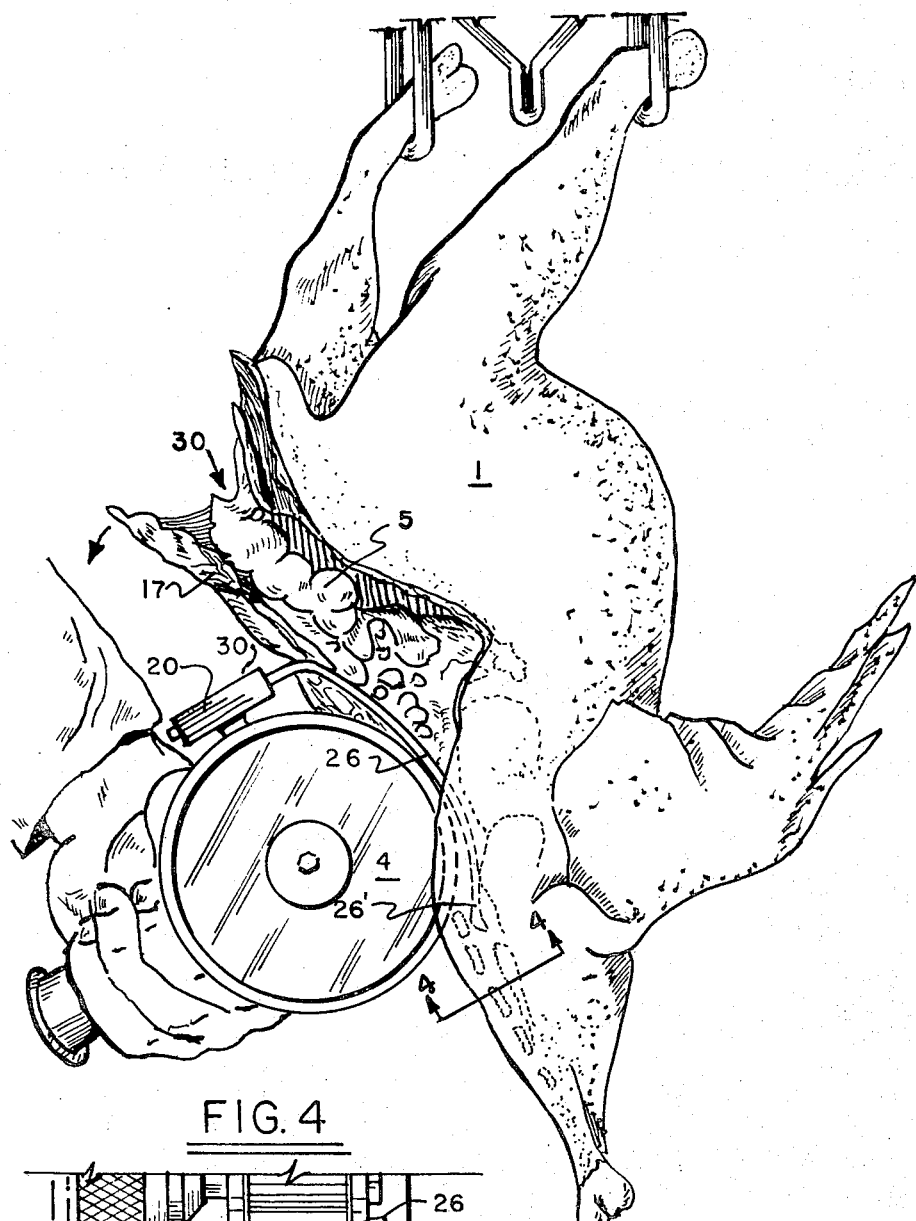
FIG. 4 is a perspective view in elevation showing a fowl with a portion thereof removed in order to show the manner in which the cutting machine oeprates to sever both the vertebrae and the portion of the inner lining to which the viscera are attached from the remaining portion of the carcass.
Figure 5:
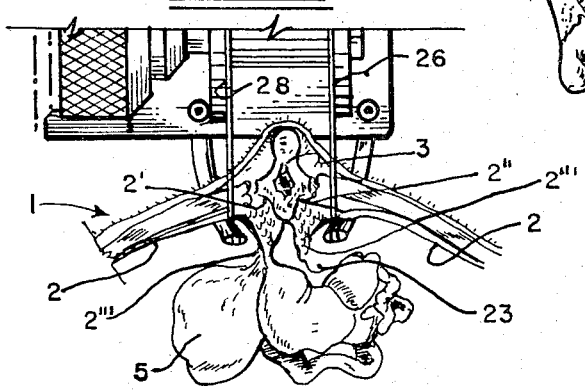
FIG. 5 is a fragmentary sectional view taken along the line 4—4 of FIG. 3 illustrating in part how the cutting blades and guides cooperate for removing the vertebrae and the inner lining portion to which the viscera are attached.

Fixedly secured to the motor housing 16 is a bracket 20. The bracket 20 is secured in a fixed position to the motor housing 16 by suitable members 22 and 24; however, the bracket may be in any suitable form and supported in any suitable manner. The bracket extends outwardly past the cutting blades as shown in FIG. 3. Adjustably fixed to the bracket are guide members 26 and 28. These guide members are in a plane with the cutting blades 4 and 6. Each of the guides is in close proximity to the cutting edge of each of the blades. The best results are obtained by slotting the guides allowing the blades to extend slightly within the slots, as shown at 26' and 28' in FIG. 2, to insure a complete cut by the cutter blades. The guides are individually adjustable by means of the set screws 30. The guides are provided with outturned end portions 26'' and 28'' (see FIG. 1) for engaging the carcass through the cloaca opening and acting as runners along and adjacent each side of the vertebrae. FIGS. 4 and 5 illustrate how the apparatus is used to extract the vertebrae and the viscera from the fowl. After the fowl has been killed and the feathers removed an opening 30 is formed about the cloaca. The ends 26'' and 28'' of the guide members 26 and 28 are then inserted through the opening and are moved along the inner surface of the carcass and on either side of the vertebrae. The rotating blades are moved along the outer upper surface of the fowl and on each side of the vertebrae from the rear to the head of the fowl as specifically illustrated in FIGS. 4 and 5. It will also be noted that the viscera 5 is secured to the inner lining adjacent the vertebrae at 2''' which portion of the lining, together with the vertebrae, is served from the carcass by the rotating blades which leaves the viscera attached to the removed vertebrae as shown in FIG. 6. After the vertebrae and viscera are removed, the fowl will appear as shown in FIG. 7, completely dressed.

FIGS. 8, 9 and 10 illustrate a method and apparatus of automatically carrying out the same process. The fowl is normally carried along by a conveyor 32. Positioned below the conveyor is an elevated table 34 having a roller 36 at one end for aiding in arranging the fowl in a horizontal position. The table is supported upon a convenient support 37 and is provided with a groove 38 into which the fowl is guided as it is moved by the conveyor over the table. The table is slanted outwardly and downwardly at 34' in the direction of the approaching fowl. The position of the fowl when moving along the upper level of the table is substantially horizontal. This allows ends 26' and 28' of the guide members 26 and 28 to engage the opening 30 and direct the cutting blades along the outer side of the fowl and at each side of the vertebrae for removing the vertebrae and the viscera as previously described. The cutter blades are operated by a suitable motor 40. The vertebrae and the viscera may be deposited in a container 42 positioned below the cutter blades as shown in FIG. 8. However, any suitable arrangement may be made for collecting the same.

While a specific method and apparatus have been described as required in Patent Office Practice, it is not intended as a limitation as other forms of apparatus may be employed which may well come within the scope of the following claims.

I claim:

1. A device for removing the vertebrae and viscera from animal carcasses including fowl, comprising:
    a. A pair of cutter blades operatably supported upon a frame member spaced apart at a sufficient distance to sever the back bone from the remainder of the carcass;
    b. A substantially narrow guide for each of the blades having one of their ends fixedly secured to the frame and extending outwardly therefrom and in close proximity and beneath each of the cutter blades and outwardly beyond said cutter blades for a substantial distance to an unsupported end, each guide adapted to extend along the inner surface of the inner cavity lining on opposite sides of the back bone area wherein the guide members support the inner cavity lining in a fixed range of the cutter blades as the device is moved over the carcass whereby upward pressure is directed to bear against the downward pressure of the upward blades, and
    c. Means for operating said cutter blades.

2. In a device as claimed in claim 1 wherein each of the cutter blades is in the form of a circular rotary cutter.

3. In a device as claimed in claim 1 wherein each respective guide is fixed to the frame at a point in a plane positioned outwardly from a plane passing through the outer surface of each of the cutter blades, each of the said guides bent inwardly towards the respective plane of each of the cutter blades to extend beneath the said blades, the extended portion of the guides being in a plane with the cutting blades, the larger opening between the guides adjacent the point of their fixed point of attachment to the frame and their portions extending beneath the said blades for allowing the severed backbone to pass freely between the guard members.

* * * * *